(12) United States Patent
Segev

(10) Patent No.: US 7,079,578 B2
(45) Date of Patent: Jul. 18, 2006

(54) PARTIAL BITSTREAM TRANSCODER SYSTEM FOR COMPRESSED DIGITAL VIDEO BITSTREAMS

(75) Inventor: Amir Segev, Ra'anana (IL)

(73) Assignee: Scopus Network Technologies Ltd., Rosh Ha'ayin (IL)

( * ) Notice: Subject to any disclaimer, the term of this patent is extended or adjusted under 35 U.S.C. 154(b) by 358 days.

(21) Appl. No.: 10/281,277

(22) Filed: Oct. 28, 2002

(65) Prior Publication Data

US 2004/0081242 A1   Apr. 29, 2004

(51) Int. Cl.
*H04B 1/66* (2006.01)
*H04N 7/12* (2006.01)

(52) U.S. Cl. .................................. 375/240.12

(58) Field of Classification Search ........... 375/240.25, 375/240.02, 240.03, 240.18, 240.2; 382/232, 382/248, 250, 251; H04N 7/12
See application file for complete search history.

(56) References Cited

U.S. PATENT DOCUMENTS

| | | | | |
|---|---|---|---|---|
| 5,646,686 A * | 7/1997 | Pearlstein | ................ | 348/392.1 |
| 6,160,844 A * | 12/2000 | Wilkinson | ................ | 375/240 |
| 6,618,445 B1 * | 9/2003 | Peng et al. | ............ | 375/240.25 |
| 6,628,712 B1 * | 9/2003 | Le Maguet | ............ | 375/240.12 |
| 6,650,707 B1 * | 11/2003 | Youn et al. | ............ | 375/240.12 |
| 6,700,935 B1 * | 3/2004 | Lee | ........................ | 375/240.16 |
| 6,748,020 B1 * | 6/2004 | Eifrig et al. | ........... | 375/240.26 |
| 6,850,567 B1 * | 2/2005 | Frimout et al. | ........ | 375/240.15 |
| 6,961,377 B1 * | 11/2005 | Kingsley | ................ | 375/240.12 |
| 6,961,383 B1 * | 11/2005 | Reibman et al. | ....... | 375/240.25 |
| 6,968,007 B1 * | 11/2005 | Barrau | ................... | 375/240.14 |
| 2002/0196853 A1 * | 12/2002 | Liang et al. | ........... | 375/240.16 |
| 2003/0156198 A1 * | 8/2003 | Lee | ........................ | 348/207.99 |

* cited by examiner

*Primary Examiner*—Nhon Diep
(74) *Attorney, Agent, or Firm*—Edward Langer, Pat. Atty.; Shiboleth, Yisraeli, Roberts, Zisman & Co

(57) ABSTRACT

A transcoder system for compressed digital video bitstreams comprising the three frame types: I-frames, P-frames and B-frames, is disclosed. The system includes a picture reader decoder to ascertain and select the type, size or estimated quality of each frame, or the DSP processing power of each frame prior to transcoding. The system also includes a $T_1$ transcoder for processing B-frames and a picture decision block for separating all I-frames and P-frames from B-frames in the case where the frame type is selected. Another component is a remerge block for recombining the output of B-frames from said $T_1$ transcoder with the untranscoded P-frames and I-frames into a reconstituted output bitstream, such that only the B-frames are processed by the much faster $T_1$ transcoder, thereby achieving substantial improvement in the transcoding throughput speed.

6 Claims, 4 Drawing Sheets

PARTIAL BITSTREAM TRANSCODER SYSTEM FOR COMPRESSED DIGITAL VIDEO BITSTREAMS

FIELD OF THE INVENTION

The present invention relates to systems for transcoding compressed digital video bitstreams. More particularly, the present invention relates to a partial bitstream transcoder system, which improves the efficiency of transcoders for the compression of digital video bitstreams.

BACKGROUND OF THE INVENTION

Digital video systems have received wide acceptance in the past decade. Digital Video Broadcasting (DVB), Digital Video Disc (DVD), Digital Video Recorders, Distant Learning, Video on Demand, and Videoconferencing are some typical examples. The key technology that enables these applications is digital video coding, which compresses video while keeping video quality satisfactory. For example, with digital video coding techniques, one current NTSC terrestrial analog TV channel can transmit four to six Standard Definition Television (SDTV) programs, each of which generally provides better video quality than the current analog NTSC TV, or it can supports the broadcasting of one High Definition Television (HDTV) program [1].

Currently, there are many video coding standards established for different video applications: e.g., H.263 for low bit-rate video applications such as video phone and video-conferencing, Motion Picture Experts Group (MPEG)-2 for high bitrate high quality applications such as digital TV broadcasting and DVD, and MPEG-4 for streaming video applications. As the digital video applications become more and more popular, there will be increasing amount of video contents encoded with various standards. For many real-time applications there are often needs to dynamically convert the video between different formats. The operation of converting a video in compressed format into another video also in compressed format is called video transcoding. A device that performs video transcoding is called a video transcoder. For example, a digital video program may originally be compressed in MPEG-2 at 9 Mb/s and stored in the server. A program provider transmits this program through a satellite channel to a cable-head-end However due to limited cable capacity, the cable-head-end has to relay this incoming video onto a cable channel at a lower bit-rate, say 5 Mbits/s, also in the compressed MPEG-2 form. To achieve this, the head-end can perform transcoding on the input video to lower its bit-rate so that the video bit-stream can be transmitted via the cable channel. In fact, besides bit-rate adaptation, a transcoder can dynamically change any coding parameters of compressed video, including frame-rate, spatial resolution, video content and/or coding standard used.

MPEG-2 is a sequence of images played by a video player. Transcoding is a technique to adapt the rate of compressed MPEG-2 video bitstreams to dynamically varying bit rate constraints. Transcoding can also be applied to any of the current popular standards: MPEG-1, MPEG-4, h.261, h.263 and h.26L. Because video is a sequence of still computer images played one after another, The approach provides an interface, or filter, between the input encoded bitstream and the network, with which the transcoder's output can be perfectly matched to the network's quality of service (QOS) characteristics.

The use of digital transmission formats is proliferating fast. The connection of several transmission media may give rise to the following problem. Suppose a content provider transmits, e.g, across a satellite link. The transmission is a compressed digital video signal, and this program is to be relayed, e.g, on a cable network.

The relayed signal must also be in the compressed format The bit-rate of the digital video signal on the satellite link is R1 (Mbits/s) and the cable network has a limited capacity, such that the incoming program can only be relayed if its bit-rate is R2 (Mbits) or less. The problem is that the incoming compressed signal at a given bit-ate has to be converted into a compressed signal of a lower bit-rate. The operation of converting a compressed format into another compressed format is called transcoding and a device that performs this conversion is called a transcoder. The specific transcoding problem of bit-rate conversion is addressed hereinbelow.

FIG. 1. is a prior art schematic block diagram of a basic configuration of a system including a transcoder. Generalizing the case, rate shaping is defined as an operation which, given an input compressed video bitstream and a set of rate constraints, produces another compressed video bitstream that complies with these constraints. If the rate constraints are allowed to vary with time, the operation is called dynamic rate shaping. The rate shaping operation is depicted in FIG. 1. Note that no communication path exists from the rate shaper to the source of the input bitstream, which ensures that no access to the encoder is necessary.

A transcoder is often used to translate from one standard to another. For a transcoder that makes a bit rate change, i.e. a transrater, there are several solutions. Table I shows the algorithmic tools for three transcoding algorithms of different levels of complexity, $T_1$, $T_2$ and $T_3$. These cases are covered by the generalized transcoder shown in FIG. 2.

TABLE I

| Algorithmic tools | $T_1$ | $T_2$ | $T_3$ |
|---|---|---|---|
| Q, VLD/VLC | ✓ | ✓ | ✓ |
| MCP, DCT/IDCT |  | ✓ | ✓ |
| Motion estimation |  |  | ✓ |

$T_{sub}1$ is the simplest transcoder. The discrete cosine transform (DCT) coefficients of the previous generation are variable length decoded (VLD), requantized ($Q_{sub}2$) and variable length coded (VLC). The info-bus is modified to reflect any change in the guantizer parameters that are signaled in the bit stream. Additionally, the drift corrector in FIG. 2 is not used, i.e., the .DELTA.-signal is set to zero. However, the latter leads to an additional reconstruction error on decoding caused by a drift between the decoder's prediction signal and the prediction signal used in the previous generation. Drift errors occur in P-frames and B-frames, and can accumulate in P-frames until the next I-frame is transcoded. Therefore, the temporal distance of I-frames has an important impact on the visibility of drift-related artifacts. Due to its low complexity, $T_{sub}1$ is a candidate for software-based implementation.

Drift can be completely avoided if the drift correction signal .DELTA. is generated as shown in FIG. 3. FIG. 3 is a prior art drift corrector for $T_{sub}2$. In this case the final reconstruction error depends on the quantization noise only. Thus, $T_{sub}2$ is the natural choice for high-quality transcoding. However, there is a significant increase in complexity due to the discrete cosine transform/inverse discrete cosine transform (DCT/IDCT) and motion compensating prediction (MCP) operations required, and much more processing power and memory is required.

Inherent to $T_1$ and $T_2$ is that the picture type. the coding decisions and the motion vectors are not changed from one generation to another. Although this is suitable for many applications, some require the algorithm $T_3$, for example when an intra frame of a high bit rate needs to be transcoded to an inter frame of a lower bit rate. A frame is a single still image in a sequence of images that, when displayed in rapid succession, creates the illusion of motion, The more frames per second (fps), the smoother the motion appears.

Intra-frame compression is compression that reduces the amount of video information in each frame on a frame-by-frame basis. Inter-frame compression is a compression scheme, such as MPEG, that reduces the amount of video information by storing only the differences between a frame and those preceding it. An important application of digital signal processing (DSP) is in signal compression and decompression. The architecture of a DSP chip is designed to carry out such operations incredibly fast, processing up to tens of millions of samples per second, to provide real-time performance. That is, the ability is required to process a signal "live" as it is sampled, and then output the processed signal, for example, to a video display.

An I-frame in inter-frame compression schemes is the key frame or reference video frame that acts as a point of comparison to P-frames and B-frames, and is not reconstructed from another frame. A B-frame is a highly compressed, bi-directional frame that records the change that occurred between the I-frame before and after it. B-frames enable MPEG-compressed video to be played in reverse. A P-frame is the predictive video frame that exhibits the change that occurred compared to the I-frame before it.

If motion vectors are not available in the previous generation, e.g., before compression or transcoding, and/or the prediction mode is changed, motion estimation has to be added, The corresponding elements in the info-bus are then changed accordingly in the drift corrector from one generation to another The presence of quantization noise can impose additional problems for a motion estimator and existing methods that normally deal with original pictures may have to be reviewed.

Quantization and rate control are key elements for high-quality transcoding.

Drift error causes variations in the focus of the picture images. Images will appear to go in and out of focus in a repeated cycle. By implementing means to reduce, or even eliminate the drift error, the images seen by the viewer are made to retain a consistently high quality of focus.

Therefore, there is a need for a method that overcomes the limitations of prior art transcoders and provides for efficient compression of digital video bitstreams.

SUMMARY OF THE INVENTION

Accordingly, it is a principal object of the present invention to overcome the limitations of prior art transcoder devices and provide a method that solves the need for efficient compression of digital video bitstreams.

It is another principal object of the present invention to overcome drift errors.

It is a further object of the present invention to improve the focus of transcoded images.

A transcoder system for compressed digital video bitstreams comprising the three frame types: I-frames, P-frames and B-frames, is disclosed. Each frame is comprised of several packets. Prior to transcoding the system will make decisions based on the frame type/size or the DSP processing power. These decisions concern the packets that will be handled during the reduction process. The system includes a picture reader decoder to ascertain and select the type, size or estimated quality of each frame, or the DSP processing power of each frame, prior to transcoding. In the preferred embodiment only the B frames or packets are selected for processing. The system also includes a $T_1$ transcoder for processing B-frames, for example, and a picture decision block for separating all I-frames and P-frames from B-frames in the case where the frame type is selected. Another component is a remerge block for recombining the output of B-frames/packets from said $T_1$ transcoder with the untranscoded P-frames and I-frames or the unhandled packets into a reconstituted output bitstream, such that only the selected packets are not processed by the $T_1$ transcoder, thereby achieving substantial improvement in the transcoding throughput speed.

The present invention uses an innovative system for transcoding picture images. In this method rate reduction is performed only on B-frames/selected packets from the first generation, i.e., as received from an input device Thus, the I-frames and P-frames/or some of the packets from the first generation are not touched at all. A rate control model is used to manage the bit allocation in order to verify that the bit rate constraints will be reached.

Statistically, consider a typical stream of MFEG-2 used at medium bitstream rates of 2 to 6 megabits, in a typical group-of-pictures (GOP), which typically comprises 12 to 15 frames. The packets of B-frames are approximately 50% of the total packets (bits) of an entire GOP, and about 75% of the frames. T-frames, in particular, generally have a large amount of bits.

A Gop is a sequence of frames with one I-frame (intra frame) and one or more P-frames or B-frames. Usually there are 2 B-frames between every pair of I-frames or P-frames in the Gop.

The exemplary mode of handling only B frames/packets) has two major benefits:

It can save up to 50% digital signal processor (DSP) power in terms of computational complexity; and The $T_1$ transcoder of the present invention is restricted to handling the B-frames. It does not suffer from the drift error, as in an unrestricted $T_1$ transcoder, because the reference I-frames and P-frames are kept untouched. The result is improved efficiency and picture quality.

In the basic mode the system handles packets, according to its configuration, on a packet basis, meaning that some of the packets, potentially in every frame, will not be handled.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout and in which.

DETAILED DESCRIPTION OF THE PREFERRED EMBODIMENTS

The invention will now be described in connection with certain preferred embodiments with reference to the following illustrative figures so that it may be more fully understood References to like numbers indicate like components in all of the figures.

Figure 1:
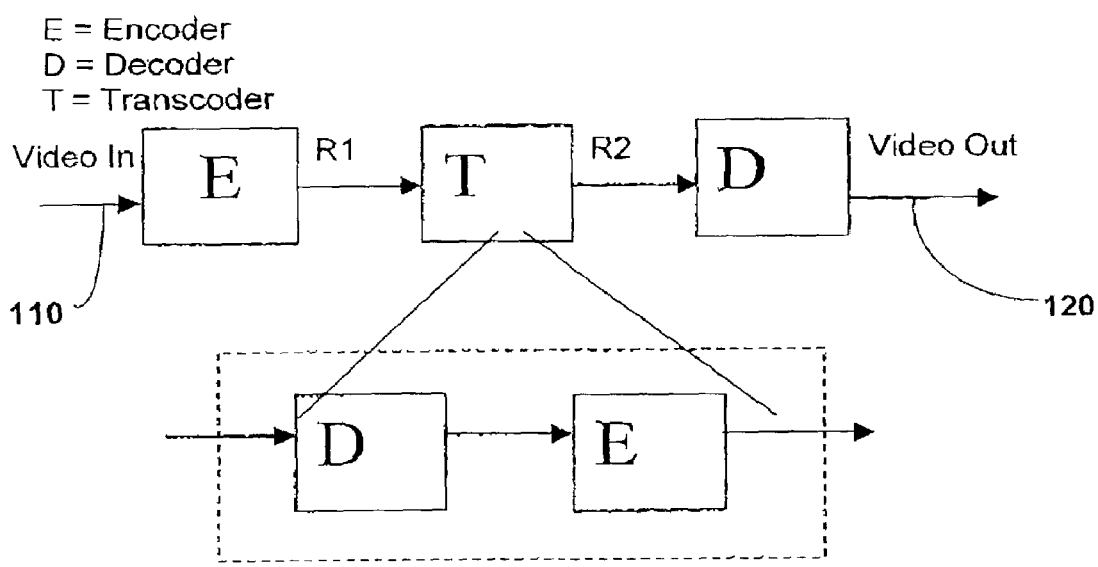
FIG. 1. is a prior art schematic block diagram of a basic configuration of a system including a transcoder.
Figure 2:
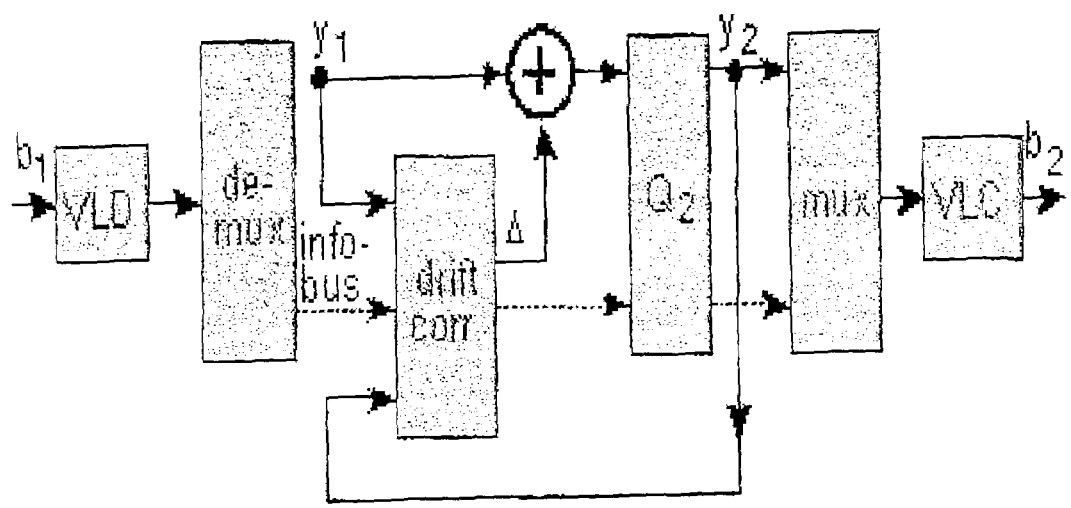
FIG. 2 is a generalized prior art transcoder.
Figure 3:
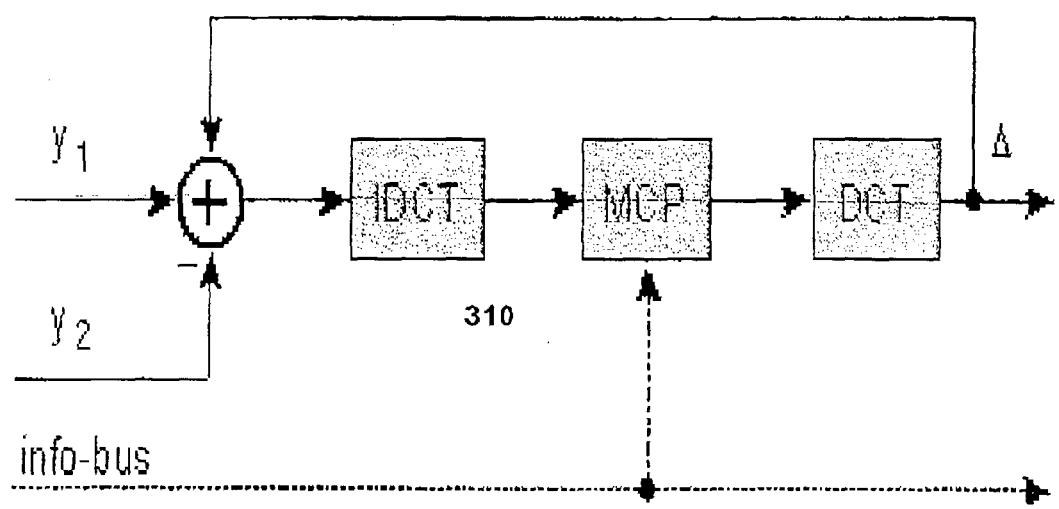
FIG. 3 is a prior art drift corrector for $T_2$.
Figure 4:
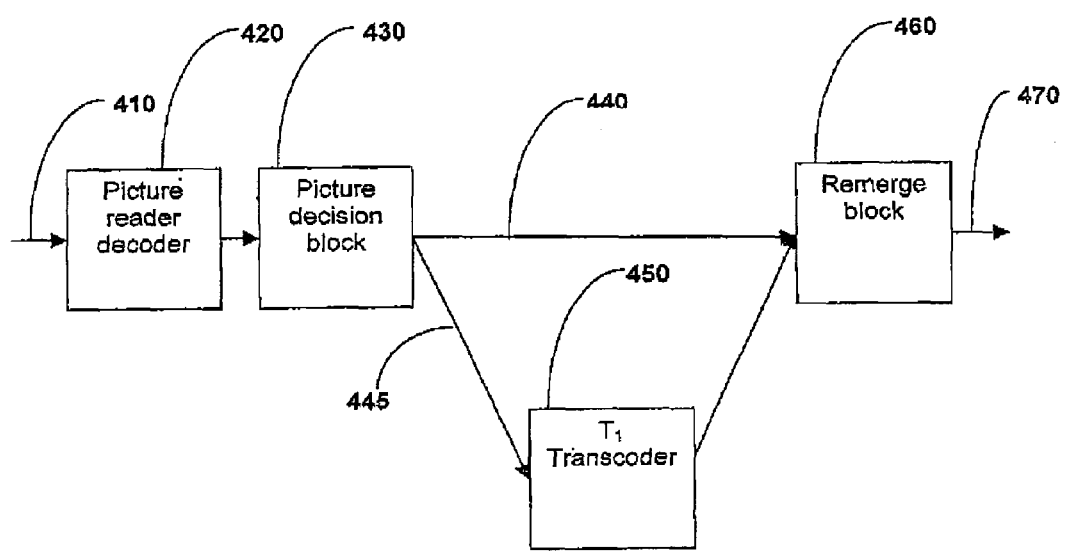
FIG. 4 is schematic block diagram of a B-only transcoder, constructed in accordance with the principles of the present invention.

FIG. 4 is schematic block diagram of a switched transcoder, constructed in accordance with the principles of the present invention. In it's 'B only' mode, the inventive coding mode is intermediate between $T_1$ & $T_2$ type transcoders, which can be implemented in a transcoder, which supports both $T_1$ and $T_2$ type modes by the addition of a switching mechanism.

In FIG. 4 there is shown an input bitstream 410 and an output bitstream 470. A picture reader decoder 420 reads input bitstream 410. Subsequently, the bitstream is processed by a picture decision block 430, which decides on the frame type, size or DSP processing power, and switches the bitstream accordingly. In a preferred embodiment, rate reduction is performed on I-frames and P-frames without transcoding 440 and on B-frames 445 using the $T_1$ transcoder 450. Untranscoded bitstreams 440, and bitstreams from $T_1$ transcoder 450 are then recombined in a remerge block 460.

Statistically, consider a typical stream of MPEG-2, using medium bitstream rates of 2 to 6 megabits, in a typical group-of-pictures (Gop), which typically comprises 12 to 15 frames. The packets of B-frames are approximately 50% of the total packets of an entire Gop.

A Gop is a sequence of frames with one I-frame (intra frame) and one or more P-frames or B-frames Usually there are 2 B-frames between every pair of I-frames or P-frames in the Gop.

This mode has two major benefits:

It can save up to 50% digital signal processor (DSP) power in terms of computational complexity; and It does not suffer from the drift error, as would an unrestricted $T_1$ transcoder, because the reference I-frames and P-frames are kept untouched. In this mode the T2 transcoder degenerates to the corresponding T1 transcoder, and so can be implemented with much improved efficiency.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

I claim:

1. A transcoder system for compressed digital video bitstreams comprising packets within the three frame types: I-frames and P-frames (reference frames); and B-frames (non-reference frames), the system comprising:
    a picture reader decoder to ascertain the type of each packet, to select packets of B-frames (non-reference frames) and to select one of the following parameters prior to transcoding:
        the estimated quality of each packet;
        the size of each packet; and
        DSP processing power;
    a $T_{sub}1$ transcoder for processing said selected packets;
    a picture decision block for separating all said packets according to said one parameter; and
    a remerge block for recombining the output of said $T_{sub}1$ transcoder and said packets not selected into a reconstituted output bitstream,
    such that said selected packets are B-frames (non-reference frames) processed by said $T_{sub}1$ transcoder, and reference frames (I-frames, P-frames) remain untouched, thereby overcoming drift error, improving the focus of transcoded images and achieving substantial improvement in the transcoding throughput speed.

2. The system according to claim 1, wherein two-thirds of the frames, comprising about half of the packets, are processed by said $T_{sub}1$ transcoder.

3. The system according to claim 1, wherein the transcoder can dynamically transform at least one of the following coding parameters of compressed video: frame rate; and video rate.

4. A transcoder system for compressed digital video bitstreams comprising the three frame types: I-frames and P-frames (reference frames); and B-frames (non-reference frames), the system comprising;
    a picture reader decoder to ascertain the type of each frame prior to transcoding;
    a $T_{sub}1$ transcoder for processing B-frames (non-reference frames);
    a picture decision block for separating all frames into: I-frames and P-frames (reference frames); and B-frames (non-reference frames);
    and a remerge block for recombining the output of B-frames from said $T_{sub}1$ transcoder and said I-frames and P-frames into a reconstituted output bitstream,
    such that only the B-frames (nonreference frames) are processed by said $T_{sub}1$ transcoder, and reference frames (I-frames, P-frames) remain untouched, thereby achieving substantial improvement in the transcoding throughput speed, while overcoming drift error and improving the focus of transcoded images.

5. The system according to claim 4, wherein two-thirds of the frames, comprising about one-half of the packets, are processed by said $T_{sub}1$ transcoder.

6. The system according to claim 4, wherein the transcoder can dynamically transform at least one the following coding parameters of compressed video: frame rate, and video rate.

* * * * *